(12) United States Patent
Ohnuma et al.

(10) Patent No.: US 7,285,936 B2
(45) Date of Patent: Oct. 23, 2007

(54) CHARGING SYSTEM FOR BATTERY-SET

(75) Inventors: Nobuhito Ohnuma, Atsugi (JP);
Masaaki Yoshikawa, Atsugi (JP);
Hikokazu Okaguchi, Atsugi (JP)

(73) Assignee: Tokyo R & D Ltd., Tokyo (JP)

( * ) Notice: Subject to any disclaimer, the term of this patent is extended or adjusted under 35 U.S.C. 154(b) by 0 days.

(21) Appl. No.: 10/432,224

(22) PCT Filed: Nov. 26, 2001

(86) PCT No.: PCT/JP01/10277

§ 371 (c)(1),
(2), (4) Date: Jun. 19, 2003

(87) PCT Pub. No.: WO02/43219

PCT Pub. Date: May 30, 2002

(65) Prior Publication Data

US 2005/0099154 A1    May 12, 2005

(30) Foreign Application Priority Data

Nov. 24, 2000 (JP) .............................. 2000-357936

(51) Int. Cl.
*H01M 10/46* (2006.01)
(52) U.S. Cl. ....................................................... 320/150
(58) Field of Classification Search ................ 320/150, 320/148, 128, 125, 106, 115, 151, 139
See application file for complete search history.

(56) References Cited

U.S. PATENT DOCUMENTS

| | | | | |
|---|---|---|---|---|
| 3,852,652 A | | 12/1974 | Jasinski | ....................... 320/150 |
| 5,363,031 A | * | 11/1994 | Miller et al. | ................. 320/115 |
| 5,440,220 A | * | 8/1995 | Sato et al. | ................... 320/134 |
| 5,489,836 A | * | 2/1996 | Yuen | ........................... 320/148 |
| 5,493,199 A | * | 2/1996 | Koenck et al. | ............. 320/106 |
| 5,519,303 A | * | 5/1996 | Goedken et al. | ............ 320/150 |
| 5,550,453 A | * | 8/1996 | Bohne et al. | ................ 320/148 |
| 5,563,496 A | * | 10/1996 | McClure | ..................... 320/128 |
| 5,583,871 A | * | 12/1996 | Simmonds et al. | ......... 320/151 |
| 5,659,239 A | * | 8/1997 | Sanchez et al. | ............. 320/150 |
| 5,668,461 A | * | 9/1997 | Hancock et al. | ............ 320/103 |

(Continued)

FOREIGN PATENT DOCUMENTS

DE          4200693          *    6/1993

(Continued)

*Primary Examiner*—Edward H. Tso
(74) *Attorney, Agent, or Firm*—Manabu Kanesaka

(57) ABSTRACT

An object is to provide a charging system in which a battery can be charged in a fully charged state or close to the fully charged state while preventing performance deterioration of a battery due to heat generated during charge. A charging system 1 for a battery-set of the invention includes a temperature detecting device 15, a charging device 12 and a control device 13 for controlling the charging device 12 based on a battery temperature. The control device 13 carries out a temperature feedback charge with "a quantity function of a temperature" ($\Delta T/\Delta t$) as a target value (Y). With the system, it is possible to charge the battery in the fully charged state or close to the fully charged state while preventing the performance deterioration of the battery due to the heat generated during the charge.

16 Claims, 9 Drawing Sheets

U.S. PATENT DOCUMENTS

| | | | |
|---|---|---|---|
| 5,717,313 A * | 2/1998 | Grabon | 320/150 |
| 5,739,673 A * | 4/1998 | Le Van Suu | 320/139 |
| 5,767,659 A * | 6/1998 | Farley | 320/106 |
| 5,825,159 A * | 10/1998 | Patino | 320/125 |
| 6,075,347 A * | 6/2000 | Sakakibara | 320/150 |
| 6,204,640 B1 * | 3/2001 | Sakakibara | 320/150 |
| 6,204,641 B1 * | 3/2001 | Sakakibara | 320/153 |
| 6,225,786 B1 * | 5/2001 | Muramatsu et al. | 320/150 |
| 6,373,228 B1 * | 4/2002 | Sakakibara | 320/150 |
| 6,404,167 B1 * | 6/2002 | Sakakibara | 320/132 |
| 6,476,584 B2 * | 11/2002 | Sakakibara | 320/150 |

FOREIGN PATENT DOCUMENTS

| | | | |
|---|---|---|---|
| DE | 0621990 | * | 11/1994 |
| EP | 1 039 612 | | 9/2000 |
| JP | 11-178231 | | 7/1999 |
| JP | 2000-3734 | | 1/2000 |

* cited by examiner

CHARGING SYSTEM FOR BATTERY-SET

TECHNICAL FIELD

The invention relates to a technology for charging a battery to be mounted on an electric motor vehicle such as an electric car. More particularly, the invention relates to a charging system for charging a battery to a fully charged state or close to the fully charged state while preventing deterioration of the battery due to heat generated during the charge.

PRIOR ART

As shown in FIG. 1, a conventional charging system 9 for an electric car includes a battery-set 91; a charging device or means 92 for charging the battery-set 91; a control device or means 93; a charge current detecting device or means 94 for detecting a charge current in the battery-set 91; a battery temperature detecting device 95 for detecting a temperature of the battery-set 91; and a charge voltage detecting device or means 96 for detecting a terminal voltage of a battery cell constituting the battery-set 91.

As shown in FIG. 2, the batteries-set 91 is formed of a plurality of modules $M_1, M_2, \ldots M_{n1}$, and further the module is formed of a plurality of battery cells $C_1, C_2, \ldots C_{n2}$. The charging device 92 includes an AC/DC converter 921 and a current supply portion 922. The AC/DC converter 921 is connected to a commercial electric power supply $G_{AC}$ (for example, single phase 100 V electric power supply). The current supply portion 922 generates a pulse IP having a predetermined duty from a DC output of the AC/DC converter 921 based on a control signal (charge current command $CC_{ref}$) from the control device 93 (described later), and supplies the pulse IP to the batteries-set 91 to charge.

The control device 93 monitors a value of a charge current $I_C$ detected by the charge current detecting device 94, and outputs a control signal (charge current command $CC_{ref}$) to the charging device 92 to maintain the charge current $I_C$ at a predetermined value (allowable maximum current value).

The control device 93 determines whether the battery is fully charged based on a $\Delta V$ peak (described later) of the charge voltage $V_C$ detected by the charge voltage detecting device 96, or based on a time-rate-of-change ($\Delta T/\Delta t$) of a temperature T of the batteries-set 91 detected by the battery temperature detecting device 95. As shown in FIG. 3, the charge voltage detecting device 96 conveniently estimates the charge voltage per battery cell by detecting a series connection voltage of a plurality of modules.

The battery temperature detecting device 95 is formed of a sensor 951 and an AD-converter 952. Generally, for a charge start condition, an upper limit is defined for the battery temperature $T_B$ (for example, when an initial temperature is above 45° C., the start of charge is limited). Therefore, it is required to check the battery temperature $T_B$.

FIG. 4 is a graph showing a relationship among the charge voltage $V_C$, charge current $I_C$ and battery temperature $T_B$ from an empty state to a fully charged state of the normal secondary batteries of the nickel-metal hydride (Ni-MH) and the like for the electric car.

When the charge starts ($t_1$ in FIG. 4), the charge voltage $V_C$ starts rising (hereinafter, an inclination of the rise will be referred to as "the first inclination"). After the first inclination ($t_2$ in FIG. 4), the charge voltage $V_C$ and the battery temperature $T_B$ increase gradually.

When the battery-set 91 is charged up to a fully charged state (for example, 80 to 90% of the fully charged state), the charge voltage $V_C$ starts rising ($t_3$ in FIG. 4; hereinafter, an inclination of the rise will be referred to as "the second inclination"). Then, the battery temperature $T_B$ starts rising ($t_4$ in FIG. 4). As the charge proceeds further, the charge voltage $V_C$ reaches a peak called as "$\Delta V$ peak" ($t_5$ in FIG. 4).

In the conventional charging system 9, the $\Delta V$ peak is normally detected, and when a voltage decline value (represented by "$-\Delta V$") reaches a predetermined value, the charge is stopped ($t_6$ in FIG. 4). Alternatively, without the $\Delta V$ peak detection, when the time-rate-of-change ($\Delta T_B/\Delta t$) of the battery temperature $T_B$ exceeds a predetermined value, the charge may be stopped.

Incidentally, in the secondary battery, it has been generally known that when the charge is carried out, an excessive rise in the battery temperature has an adverse effect on the performance and life of the battery. As shown in FIG. 4, in the conventional charging system 9 shown in FIG. 1, the charge is stopped at a time $t_6$ not long after the $\Delta V$ peak ($t_5$). Accordingly, the battery cells constituting the battery-set 91 do not reach a battery temperature in the graph that causes the deterioration (hereinafter referred to as "critical temperature") Also, in the charging system 9, since the battery temperature $T_B$ is detected by the battery temperature detecting device 95, the battery cells or modules appear not to reach the critical temperature.

However, as described above, the $\Delta V$ peak is not detected for each battery cell or module. Therefore, the following problems may occur due to a variation in the capacity, for example, when the battery cells or modules are produced, or due to a difference in the temperature (depending on a location of the battery cell in the whole battery-set).

That is, it is likely to happen that a battery cell or module whose temperature is not monitored reaches the $\Delta V$ peak before a battery cell or module whose temperature is monitored by the sensor 951 does not yet reach the $\Delta V$ peak.

Also, it is possible that when a plurality of battery cells or modules is connected in series and the $\Delta V$ peak is detected, some of the battery cells or modules that the sensor 951 monitors have already passed the $\Delta V$ peak, but, the entire battery cells or modules connected in series do not yet reach the $\Delta V$ peak. In each of the battery cells or modules, since the terminal voltage thereof is lowered after the $\Delta V$ peak, such a situation may occur.

An actual temperature of a battery cell depends on whether the battery cell is placed at a position where the battery cell is easily cooled. In the actual case, the battery temperature detecting device 95 does not detect a temperature of each of the battery cells or modules. Therefore, there may be a case where the actual temperature of a certain battery cell is higher than the temperature detected by the battery temperature detecting device 95.

Moreover, in the conventional charging system, as shown in FIG. 4, when the charge is completed ($t_6$ in FIG. 4), there may be a case that the battery temperature $T_B$ is higher than the initial temperature, for example, by about 10 to 40° C. Accordingly, some of the battery cells have exceeded the critical temperature before the charge is completed.

Especially, in the electric car, the battery-set is formed of a plurality of the battery cells connected in series. Thus, when a part of the battery cells is deteriorated, the electric car as a whole suffers deteriorated performance. In case such a functional deterioration occurs, it is difficult to find out which battery cell is in trouble.

When two or more module groups (the modules connected in series) are provided for detecting the charge voltage (a plurality of the charge voltage detecting devices is provided), it is possible to solve the above described problems to some extent. However, it is necessary to provide the AD-converters as many as the charge voltage detecting devices.

Since the value of "−ΔV" per battery cell is very small, such as several milli-volts, an expensive (i.e. high precision) AD-converter needs to be used.

In the conventional power supply device, the production cost needs to be reduced as well. Thus, it is not preferable to use two or more module groups for detecting the charge voltage and two or more AD-converters, which results in a higher cost of the charging system.

PREFERRED EMBODIMENTS FOR PROSECUTING THE INVENTION

An embodiment of a charging system according to the present invention will be described with reference to FIGS. 5-9.

Figure 5:
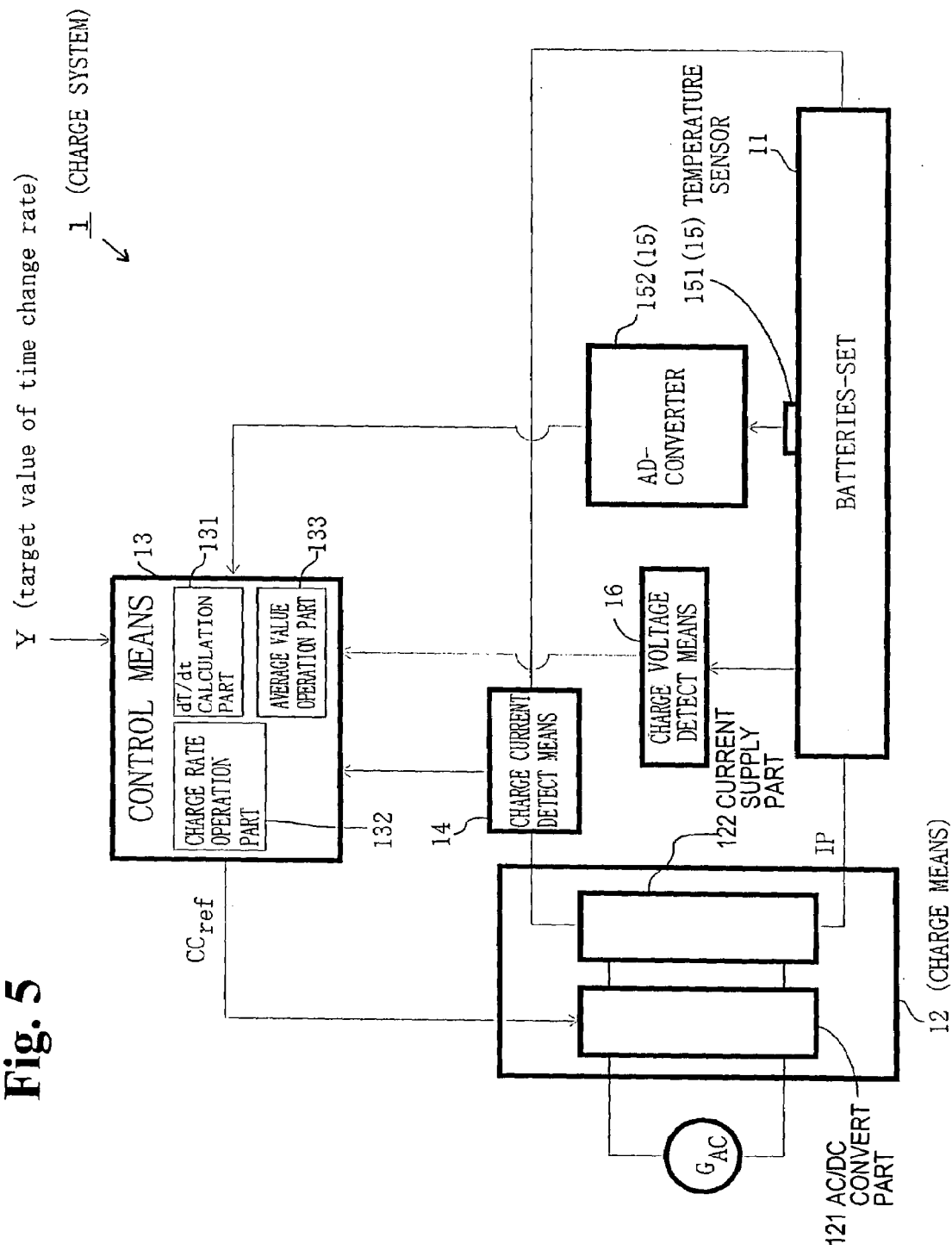
FIG. 5 is a block diagram showing a charging system according to the present invention.
Figure 6:
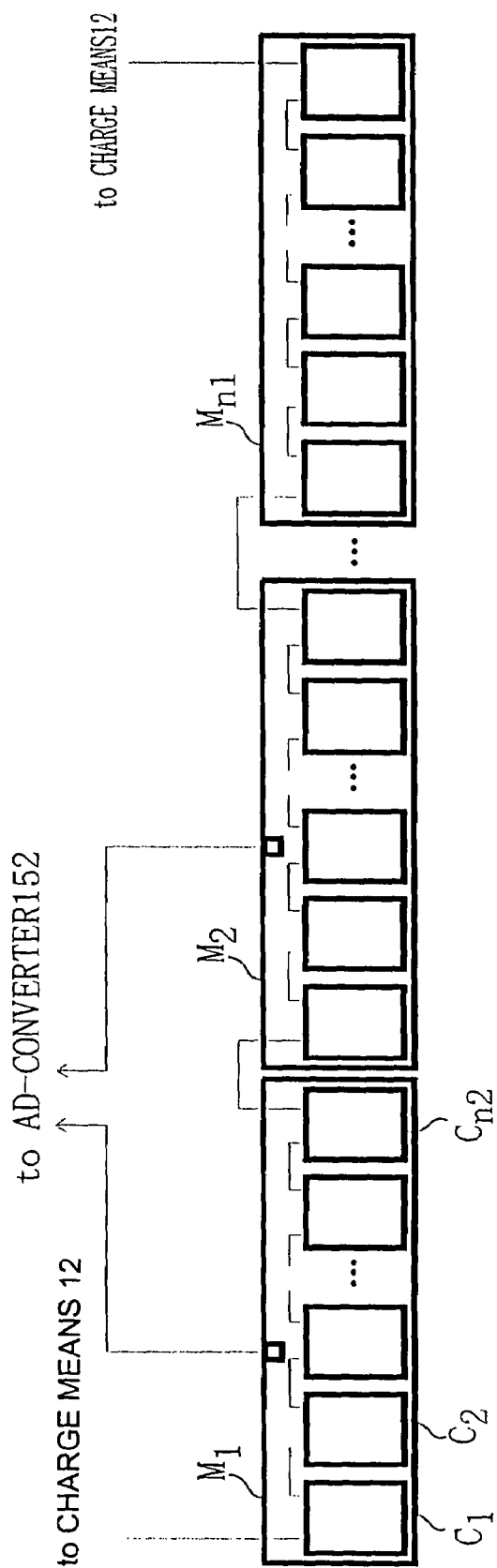
FIG. 6 is a block diagram showing a battery-set used in the charging system shown in FIG. 5.

FIG. 5 is an explanatory view showing an entire configuration of an embodiment of the invention. As shown in the drawing, a charging system 1 includes a battery-set 11; a charging device or means 12 for supplying a charge current to the battery-set 11; a control device or means 13 for controlling the charging device 12; a charge current detecting device or means 14 for detecting the charge current of the battery-set 11; a battery temperature detecting device or means 15 for measuring a temperature of the battery-set 11; and a charge voltage detecting device or means 16. As shown in FIG. 6, the batteries-set 11 is formed of a plurality of modules $M_1, M_2, \ldots, M_{n1}$, and each module includes a plurality of battery cells $C_1, C_2, \ldots, C_{n2}$. In the present embodiment, a nickel-metal hydride (Ni-MH) type battery may be used as the battery cell.

The charging device 12 includes an AC/DC converter 121 and a current supply portion 122. In the present embodiment, a commercial power source $G_{AC}$ (single phase 100V power source) is connected to the AC/DC converter 121. The current supply portion 122 generates a pulse IP of a predetermined duty from a DC output of the AC/DC converter 121 based on a control signal (charge current command $CC_{ref}$) from the control device 13, and supplies the pulse IP to the batteries-set 11.

The control device 13 includes a ΔT/Δt calculating (operation) portion, or a dT/dt calculation part, 131; a charging rate operation portion; or a charge rate operation part, 132; and an average value operation device, or an average value operation part, 133. Control modes of the control device 13 include a temperature feedback charging mode TFB-CM and a low current charging mode TCL-CM. According to the control mode, the control device 13 sends the charge current command $CC_{ref}$ to the charging device 12. In the temperature feedback charging mode TFB-CM, the control device 13 controls the charging device 12 through the feedback control using a quantity representing a temperature as a target value.

In the present embodiment, "a quantity representing a temperature" is a value representing a time-rate-of-change (ΔT/Δt) of the temperature $T_B$ of the batteries-set 11. The average value operation device 133 calculates an average temperature value of an N number of the modules as a battery temperature $T_B$.

Figure 7:
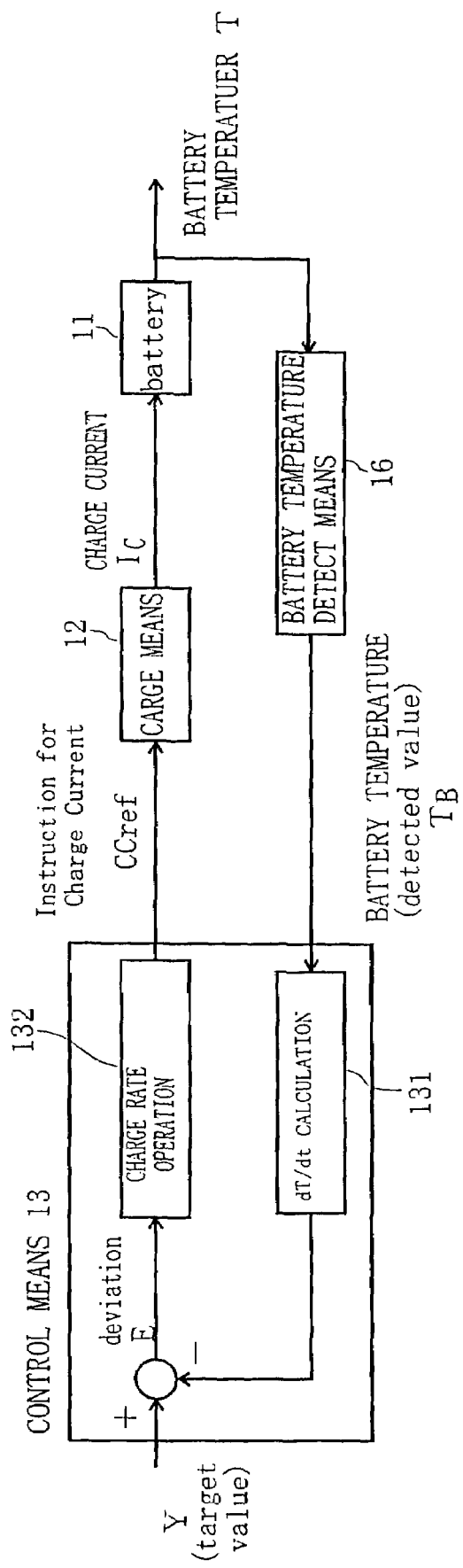
FIG. 7 is a control block diagram of the charging system in FIG. 5 in a temperature feedback charging mode.

FIG. 7 shows a control block diagram of the charging system 1 in the temperature feedback charging mode TFB-CM. First, the battery temperature detecting device 15 detects the battery temperature $T_B$ and sends the battery temperature $T_B$ to the control device 13.

In the control device 13, the ΔT/Δt calculating portion 131 determines a time-rate-of-change $(\Delta T/\Delta t)_{T=TB}$ of the battery temperature $T_B$. The charging rate operation portion 132 outputs the charge current command $CC_{ref}$ to the charging device 12 based on a deviation E between the time-rate-of-change $(\Delta T/\Delta t)_{T=TB}$ and the target value Y. The charging device 12 supplies the charge current $I_C$ to the battery-set 11 based on the charge current command $CC_{ref}$.

In the low current charging mode TCL-CM, the control device 13 controls the charging device 12 to charge at a predetermined maintenance current $I_{TC}$. Incidentally, a transition condition from the temperature feedback charging mode TFB-CM to the low current charging mode TCL-CM will be described later.

The battery temperature detecting device 15 includes a temperature sensor 151 and an AD-converter 152. The charge voltage detecting device 16 detects the charge voltage $V_C$ of the batteries-set 11. However, not like in the conventional technology shown in FIGS. 1 through 4, the charge voltage detecting device 16 does not detect the ΔV peak or −ΔV. As described above, it is necessary to use a high-precision (i.e. expensive) AD-converter to detect the ΔV peak or −ΔV. In the present embodiment, it is not necessary to use such an expensive AD-converter, so it is possible to use a less expensive AD-converter as the AD-converter constituting the charge voltage detecting device 16.

Incidentally, in the present embodiment, the charge voltage detecting device 16 is used for monitoring and managing the lower limit voltage and upper limit voltage of the batteries-set 11.

Figure 8:
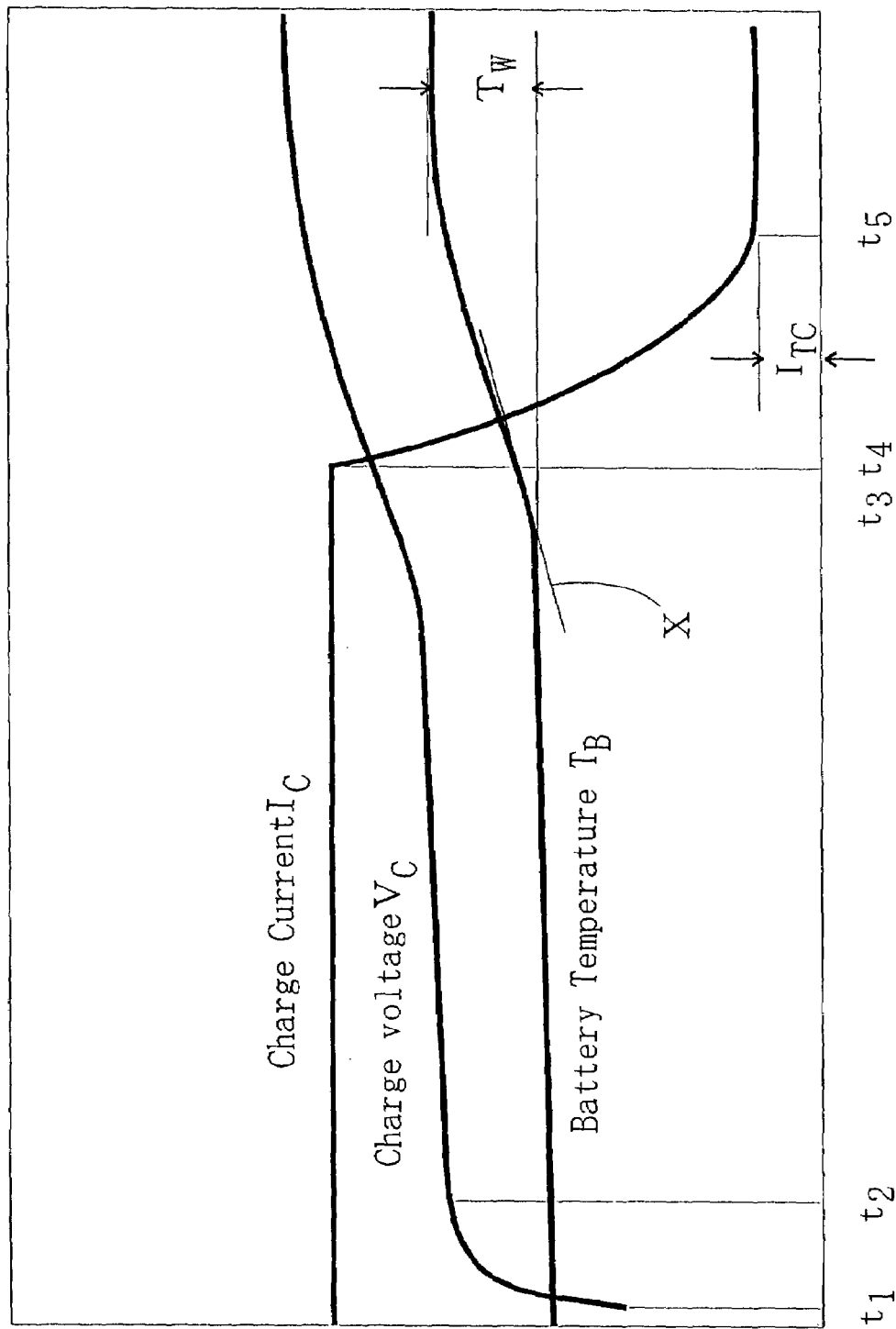
FIG. 8 is a graph showing a relationship among a charge current, battery temperature and charge voltage from an empty state to a fully charged state of the charging system shown in FIG. 5.

FIG. 8 is a graph showing a relationship among the charge current $I_C$, battery temperature $T_B$, and charge voltage $V_C$ from an empty state to a fully charged state of the charging system 1 shown in FIG. 5.

When the charge of the battery-set 11 is started ($t_1$ in FIG. 8), the charge voltage $V_C$ starts increasing. When the charge voltage $V_C$ passes through the first inclination ($t_2$ in FIG. 8), the charge voltage $V_C$ generally becomes a steady state. At this time, the battery temperature $T_B$ is also generally in a steady state. Incidentally, in FIG. 8, the initial value of the battery temperature $T_B$ is substantially the same as the battery temperature $T_B$ in the steady state.

When the battery-set 11 is charged close to a full charge (for example, when the battery-set 11 is charged up to 80% of the full charge), the battery temperature $T_B$ starts increasing ($t_3$ in FIG. 8). As described above, in the temperature feedback charging mode TFB-CM, the control device 13 controls the charging device 12 with Y as the target value. At this time, the charging rate operation portion 132 in FIG. 7 may output the charge current command $CC_{ref}$ to the charging device 12 so that the charge current (charging rate) $I_C$ is defined, for example, by the following equation (1):

$$I_C = I_S \times [1-(G_P \cdot E + G_i \cdot \int E dt + G_d \cdot \Delta E)] \quad (1)$$

wherein $I_C$ is a charge current,
$I_S$ is a rated current,
E is a deviation ($=Y-(\Delta T/\Delta t)_{T=TB}$),
$\Delta E$ is a deviation difference,
$G_p$ is a proportional gain,
$G_i$ is an integral gain, and
$G_d$ is a differential gain.

After the charge current $I_C$ passes through the peak, the charge current $I_C$ decreases gradually. In the present embodiment, when the charge current becomes $I_{TC}$ ($t_5$ in FIG. 8), the control device 13 switches to the low current charging mode TCL-CM.

Figure 9:
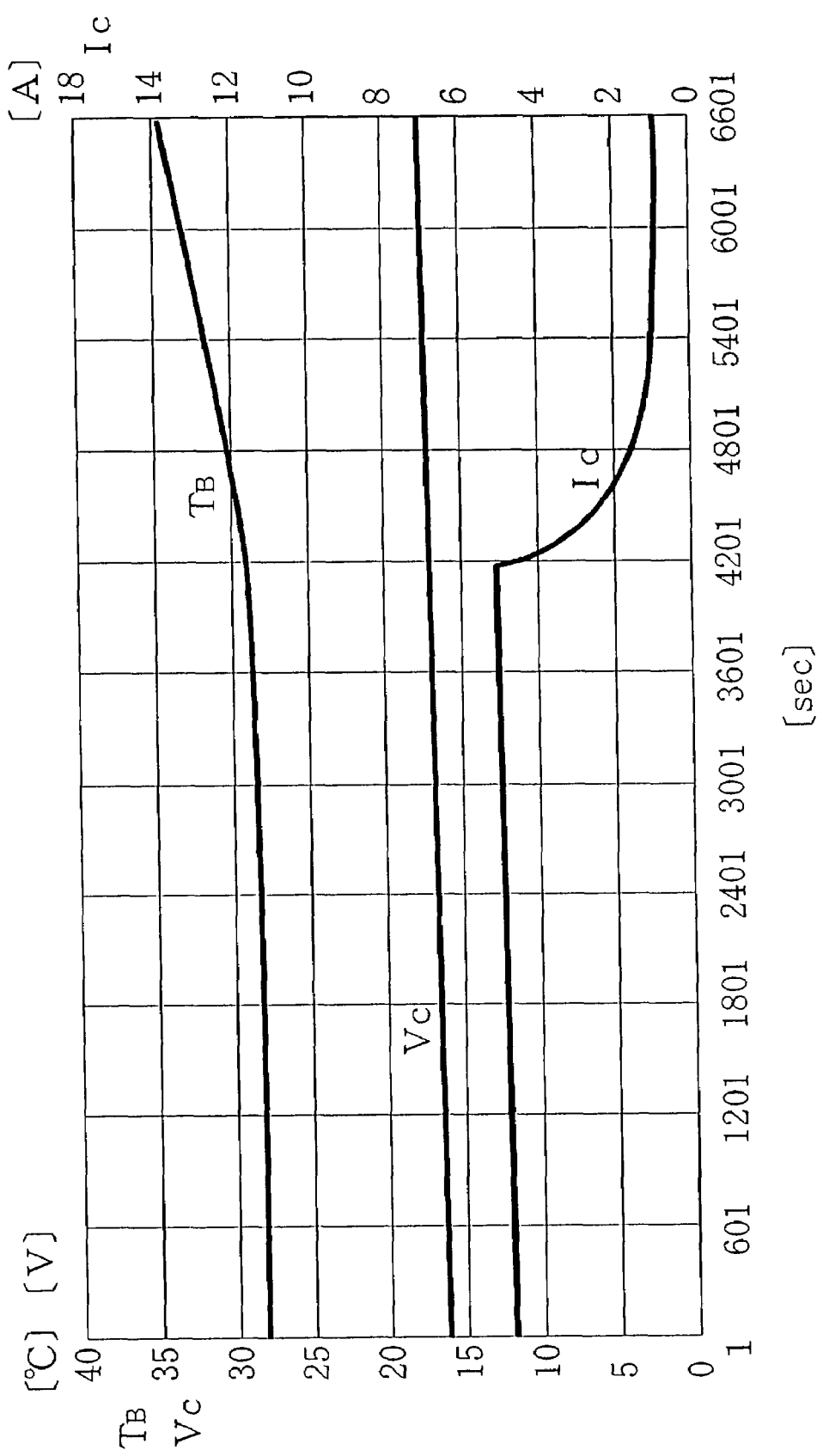
FIG. 9 is a graph showing measured results of the charge current, charge voltage and battery temperature in the temperature feedback charging mode.

In FIG. 9, actual results of the charge current $I_C$, charge voltage $V_C$ and battery temperature $T_B$ in the temperature feedback charging mode TFB-CM are shown. Incidentally, in the measurement, the control in the low current charging mode TCL-CM was not carried out.

In the measurement, $I_S$ (rated current) is equal to 5 A, Y (desired value) is equal to 0.1° C./minute, $G_p$ (proportional gain) is equal to 5.0, $G_i$ (integral gain) is equal to 5.0, and $G_d$ (differential gain) is equal to 0 in Equation (1).

In calculating the time-rate-of-change $(\Delta T/\Delta t)_{T=TB}$ of the temperature, and updating the deviation E, the deviation product $\int E dt$ and the deviation difference $\Delta E$, each cycle was set at 10 seconds, the damping time constant was set at one minute, and the lower limit value of the charge current $I_C$ was set at 0.5 A. The charge was determined to be completed at a point of 30 minutes after the charge current $I_C$ became less than 1 A for the first time.

As shown in FIG. 9, 0.12° C./minute of the battery temperature $T_B$ was obtained with respect to the target value Y of 0.1° C./minute. The temperature increase $T_W$ from the start to the completion of the charge was 7° C. The time $T_{Total}$ from the empty state to the charge completion was 110 minutes.

After the completion of the charge, a discharge test was carried out to obtain the battery capacity, and it was found that the battery capacity was substantially the same as that obtained in the conventional charging system.

In the above measurement, the temperature increase T was about 7° C. irrespective of the charging initial temperature of the battery-set 11 (an outside temperature). When the outside temperature is abruptly increased during the charge, the charging rate, i.e. charge current command $CC_{ref}$, is temporarily lowered. In the present invention, since the charging device 12 is controlled so that the time-rate-of-change $\Delta T/\Delta t$ of the temperature of the battery-set 11 becomes the steady value (Y), the charging rate lowered as described above returns to the original value.

Figure 1:
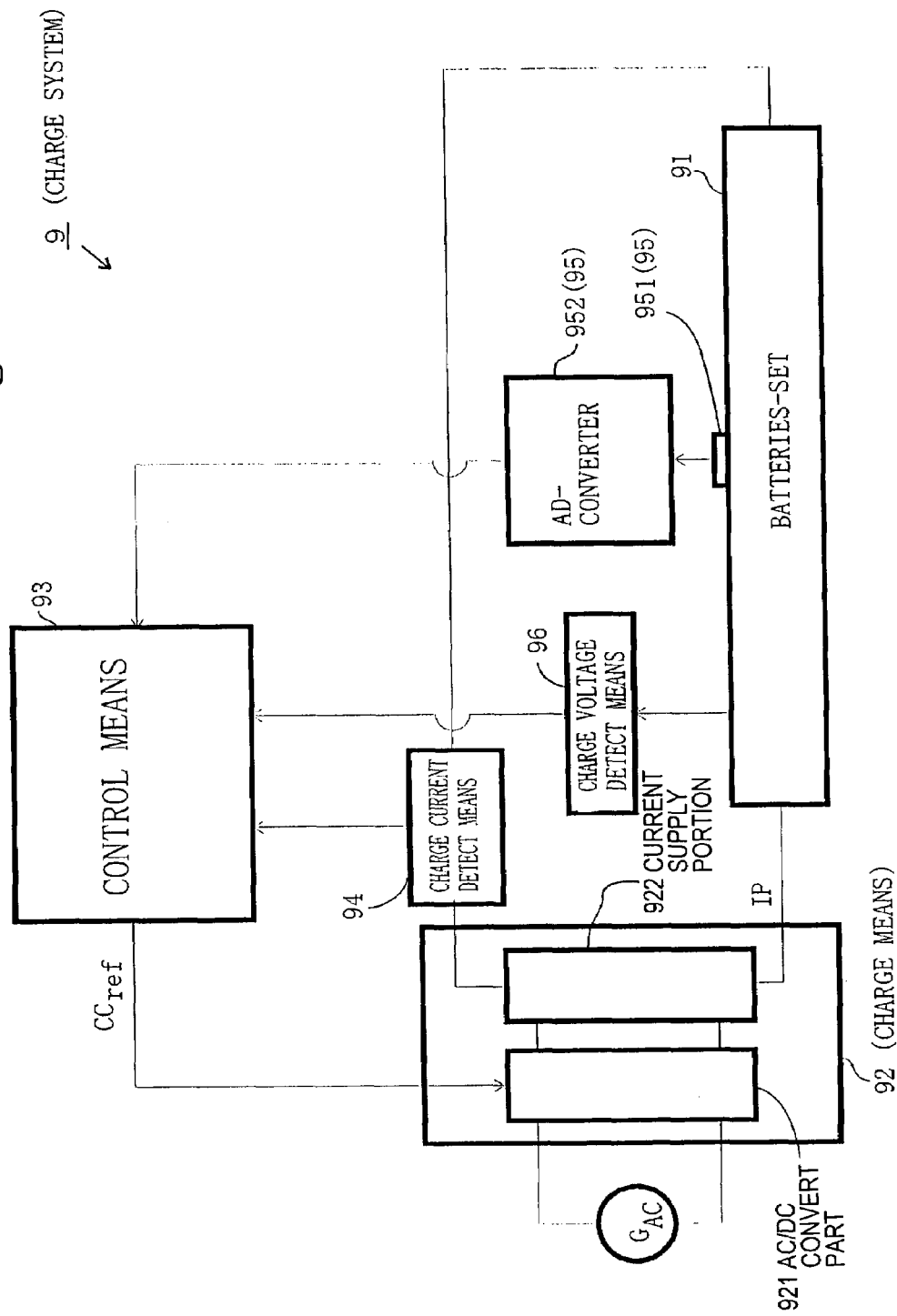
FIG. 1 is a block diagram showing a conventional charging system.
Figure 2:
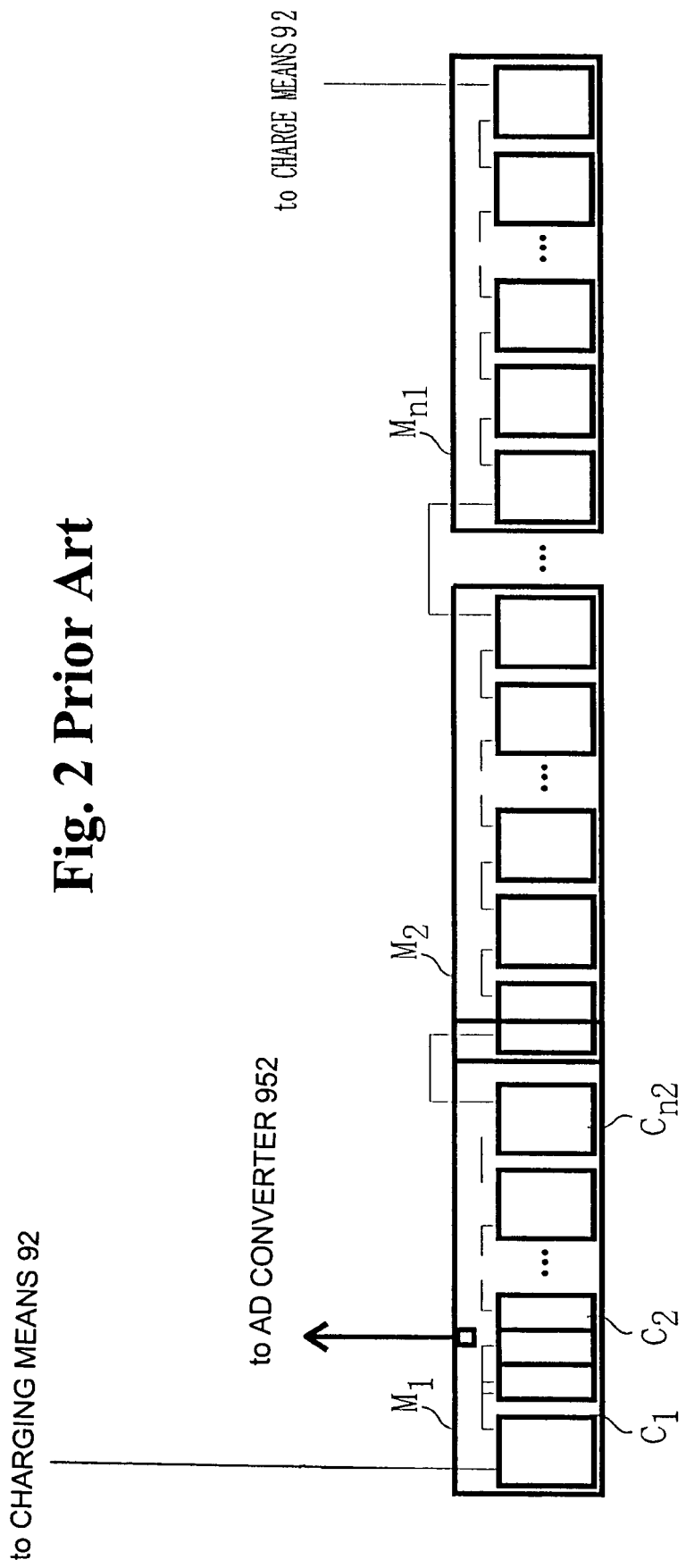
FIG. 2 is an explanatory diagram showing a battery used in the conventional charging system shown in FIG. 1.
Figure 3:
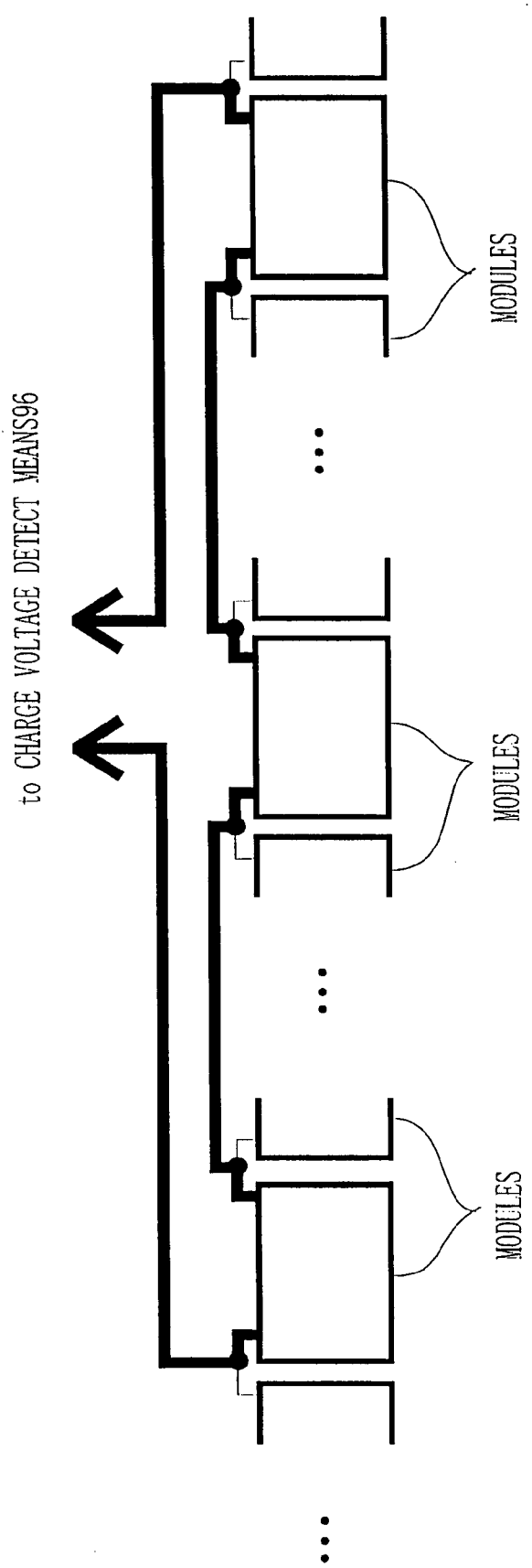
FIG. 3 is a view of battery modules in which charge voltage detect means detects a charge voltage per battery cell in the conventional charging system shown in FIG. 1.
Figure 4:
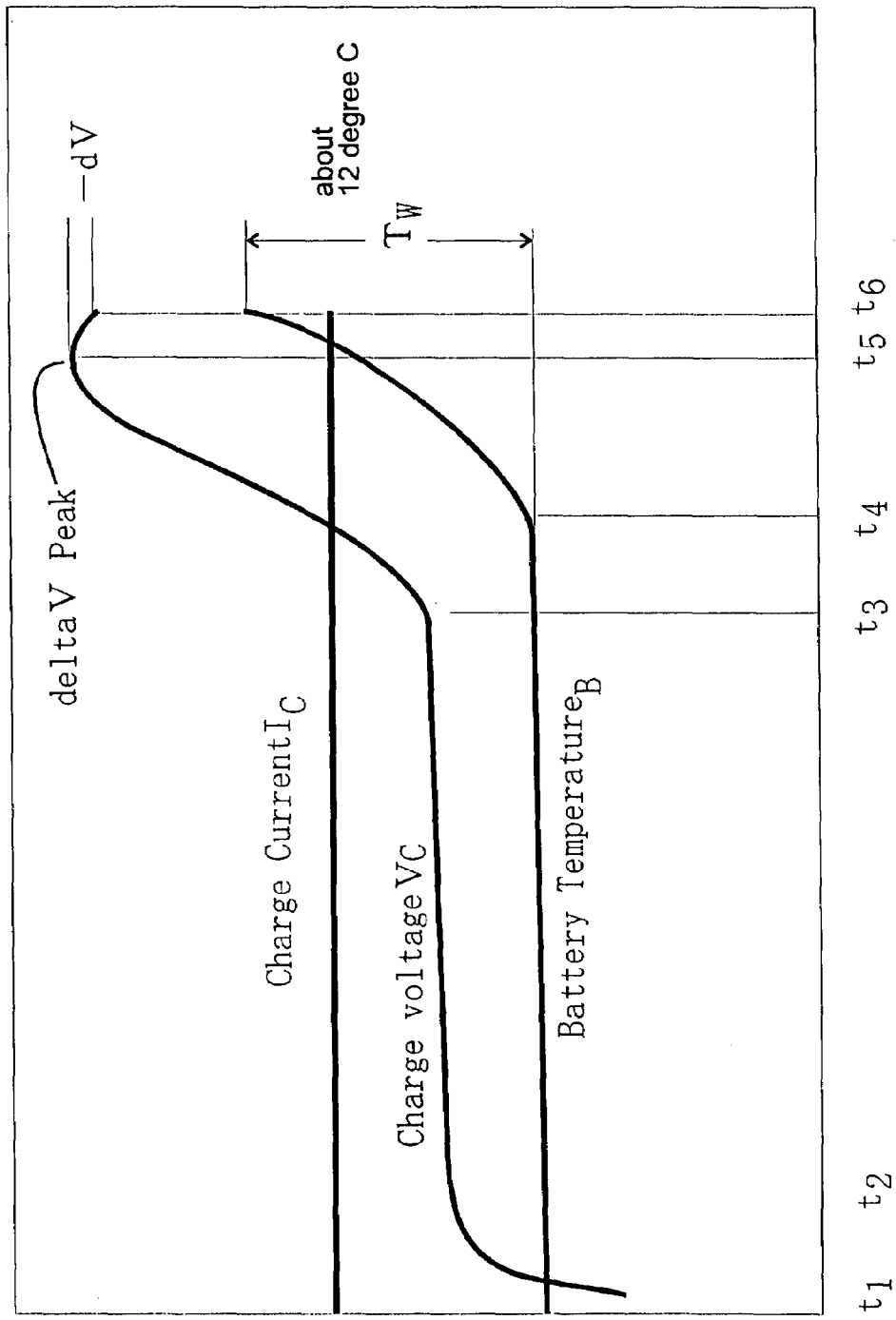
FIG. 4 is a graph showing a relationship among a charge current, battery temperature and charge voltage from an empty state to a fully charged state of the conventional charging system shown in FIG. 1.

As shown in FIG. 4, the conventional charging system shows the temperature increase $T_W$ of about 12° C. Therefore, there is a risk that a certain battery cell reaches the critical temperature. In the conventional charging system, it is necessary to provide a plurality of battery temperature detecting devices to detect that the battery cell or module reaches the critical temperature at an early stage. Also, when the initial temperature is high, it is necessary to delay the charge.

In the present embodiment, it is possible to charge the battery-set while the temperatures of all the battery cells are controlled to be sufficiently lower than the critical temperature. Therefore, the risk that a certain battery cell reaches the critical temperature is reduced. Even if the initial temperature is high to a certain extent and still the charging is started, it is possible to prevent the battery cells from reaching the critical temperature.

INDUSTRIAL APPLICABILITY

It is possible to avoid such a situation that any of the battery cells reach the critical temperature due to the charge. Also, it is possible to avoid such a situation that unnecessary stress is applied to any of the battery cells. Therefore, the life of the battery cells or modules constituting the battery-set is expected to be longer and uniform.

The present charging system can be applied to a system wherein secondary batteries having a characteristic that a temperature is raised at a terminal stage of the charge are used. Therefore, the present charging system can be applied to various instruments using the secondary batteries in addition to the electric car.

Since the charge voltage detecting device in the present system does not detect the $\Delta V$ peak, a less expensive AD-converter can be employed, thereby reducing a cost of the entire system.

As described above, according to the present invention, it is possible to prevent the sudden increase in the charge voltage, and to reduce the risk that a certain battery cell reaches the critical temperature without relying on the $\Delta V$ peak. Further, it is possible to charge the battery to the fully charged state, or a state almost equal to the fully charged state.

As described above, the object of the present invention is to provide the charging system without increasing the cost. With the charging system, it is possible to eliminate or reduce the risk where all the battery cells constituting the battery-set reaches the critical temperature, and to charge the battery-set up to the so-called full charged state. The present invention provides the following preferred embodiment.

In the conventional charging system, after the second inclination, the battery-set is almost (specifically about 80%) fully charged, and the current is consumed as heat. As a result, the charging efficiency is lowered, and the battery temperature is increased after the second inclination.

Also, it is determined that the charging is completed based on the $\Delta V$ peak showing the full charge or based on the time-rate-of-change of the battery temperature. Thus, a certain battery cell may reach the critical temperature.

In view of the above problems, the present invention has been made based on a relationship between the battery temperature and the charge current. Through that approach, it was found to be possible to (1) prevent a sudden charging voltage increase, and (2) eliminate or reduce the risk that any of the battery cells reaches the critical temperature without relaying on the $\Delta V$ peak. Further, it is possible to charge the battery-set to the full charged state or the equivalent state.

According to the present invention, the charging system for charging a battery includes the temperature detecting device for detecting the temperature of the battery; the charging device for charging the battery; and the control device for controlling the charging device. The control device controls the charging device based on the temperature of the battery through temperature feedback.

A battery-set of an electric car is formed of a plurality of battery cells. For example, a batteries-set is constituted of a plurality of modules, and each module includes a plurality of the battery cells.

In the present invention, the temperature detecting device detects a value typically representing temperatures of the modules constituting the battery-set or a temperatures of the battery cells as a "battery temperature". The temperature detecting device may detect a temperature of one module among the modules as the "battery temperature", or detect an average value of more than two modules as the "battery temperature". Also, the temperature detecting device may detect a temperature of one battery cell among a plurality of the battery cells as the "battery temperature", or detect an average value of more than two battery cells as the "battery temperature".

In the present invention, the temperature detecting device includes a temperature sensor and an AD-converter. When an average value of more than two modules is detected as the battery temperature, an average value operation device may be included therein. Incidentally, an appropriate processor such as CPU in the control device may function as the average value operation device. Alternatively, although substantially the same and just depending on a definition of "the temperature detecting device", the average value operation device may be included in the control device, not in the temperature detecting device.

In the present invention, the control device may control the charging device through the temperature feedback with "the time-rate-of-change ($\Delta T/\Delta t$) of the temperature T", as a target value.

In other words, the control device controls a charge current so that the time-rate-of-change of the temperature T does not exceed a constant value. As a result, it is possible to prevent the temperatures of all the battery cells constituting the battery-set from increasing suddenly, i.e. from reaching the critical temperature.

In the conventional charging system, the charge is stopped when the time-rate-of-change ($\Delta T/\Delta t$) of the battery temperature $T_B$ exceeds a predetermined value. Therefore, when the "true $\Delta T/\Delta t$" is not detected correctly due to an elevation of the outdoor temperature, the charge is stopped before the charge is fully completed. On the other hand, in the charging system according to the present invention, the control device controls the charging device through the temperature feedback. Therefore, when the "original $\Delta T/\Delta t$" is not detected correctly due to an elevation of the outdoor temperature, the control device reduces the charging current. After the "$\Delta T/\Delta t$" decreases, the charge current is again increased.

In the present invention, as described above, the control device basically controls the charging device through the temperature feedback. The control device may control the output current in a constant current charge mode before the time-rate-of-change ($\Delta T/\Delta t$) of the temperature T exceeds a predetermined value. When the value based on the battery temperature exceeds a predetermined value, the control device may control the charging device through the temperature feedback.

In the present invention, during the control through the temperature feedback, the control device may control the charging device so that when the charge current becomes below a certain value, the charge current becomes zero or a low current charge is carried out. The "low current charge" is defined as a charge with a current value in the order of not having an adverse affect on the battery life.

Further, in the present invention, the control device may control the charging device so that the charge current becomes zero or the low current charge is carried out after a predetermined time since the charge current becomes below a certain value. The control device may control the charging device so that the charge current becomes zero or the low current charge is carried out when the battery temperature reaches a certain value. The control device may also control the charging device so that the charge current becomes zero or the low current charge is carried out when the battery temperature increases by a predetermined value since the battery temperature reached a certain value.

What is claimed is:

1. A charging system for an assembled battery, comprising:
    temperature measuring means for detecting a temperature of a battery;
    charging means having charging current as a variable output, said charging means charging the battery;
    operation means for obtaining time variation relative to battery temperature; and
    control means for controlling charging current of the charging means along first, second and third periods in charging the battery,
    wherein in the first period, the charging means applies a predetermined charging current, said first period ending when said operation means detects a predetermined time variation;
    in the second period, said control means performs a feedback control so that said time variation is kept same as in an end of the first period, said second period ending when the control means receives a signal from at least one of the charging means and the operation means; and
    in the third period, a charging current equal to or smaller than the charging current is applied at an end of the second period.

2. A charging system according to claim 1, wherein said second period ends when the charging current given by said feedback control reaches a predetermined value.

3. A charging system according to claim 1, wherein the second period ends when a predetermined time elapses after the charging current given by said feedback control reaches a predetermined value.

4. A charging system according to claim 1, wherein the second period ends when the battery temperature reaches a predetermined value while performing said feedback control.

5. A charging system according to claim 1, wherein the second period ends when the battery temperature increases by a predetermined incremental value after the battery temperature reaches a predetermined value while performing said feedback control.

6. A charging system according to claims 1, wherein said charging current for the third period is zero.

7. A charging system according to claim 1, further comprising an assembled battery, said assembled battery comprising a plurality of battery cells, said temperature measurement means detecting temperature of one of the battery cells and regards as the temperature of the assembled battery.

8. A charging system according to claim 1, further comprising an assembled battery, said assembled battery comprising a plurality of battery cells, said temperature measurement means detecting temperatures of at least two battery cells and regarding an average of the temperatures of the temperature sensed cells as the temperature of the assembled battery.

9. A charging system according to claim 1, further comprising an assembled battery, said assembled battery comprising a plurality of battery cells, said temperature measurement means detecting temperatures of at least two battery cells, said temperature measurement means regarding a maximum temperature of the temperature sensed cells as the temperature of the assembled battery.

10. A charging system according to claim 1, further comprising an assembled battery, said assembled battery comprising a plurality of battery modules, each consisting of a plurality of battery cells, said temperature measurement means detecting temperature of one of the modules and regarding as the temperature of the assembled battery.

11. A charging system according to claim 1, further comprising an assembled battery, said assembled battery comprising a plurality of battery modules, each consisting of a plurality of battery cells, said temperature measurement means detecting temperature of at least two modules and regarding an average of the temperatures of the temperature sensed modules as the temperature of the assembled battery.

12. A charging system according to claim 1, further comprising an assembled battery, said assembled battery comprising a plurality of battery modules, each consisting of a plurality of battery cells, said temperature measurement means regarding a maximum temperature of the temperature sensed modules as the temperature of the assembled battery.

13. A charging system according to claim 1, further comprising an assembled battery, said assembled battery comprising a plurality of battery modules, each consisting of a plurality of battery cells, said temperature measurement means detecting temperature of one of the cells and regarding as the temperature of the assembled battery.

14. A charging system according to claim 1, further comprising an assembled battery, said assembled battery comprising a plurality of battery modules, each consisting of a plurality of battery cells, said temperature measurement means detecting temperature of at least two of the cells and regarding an average of the temperatures of the temperature sensed cells as the temperature of the assembled battery.

15. A charging system according to claim 1, further comprising an assembled battery, said assembled battery comprising a plurality of battery modules, each consisting of a plurality of battery cells, said temperature measurement means regarding a maximum temperature of the temperature-sensed cells as the temperature of the assembled battery.

16. An electric vehicle comprising a battery and the charging system according to claim 1.

* * * * *